Jan. 8, 1957. R. W. EGGLESTONE ET AL 2,777,079
OUTDOOR MOTOR
Filed Sept. 23, 1953 3 Sheets-Sheet 1

WITNESSES:
John E. Healy
Leon M. Garman

INVENTORS
Robert W. Egglestone &
Paul E. Graham
BY
ATTORNEY

Jan. 8, 1957.   R. W. EGGLESTONE ET AL   2,777,079
OUTDOOR MOTOR

Filed Sept. 23, 1953   3 Sheets-Sheet 2

WITNESSES:
John E. Heasley
Leon M. Garman

INVENTORS
Robert W. Egglestone &
Paul E. Graham
BY
ATTORNEY

United States Patent Office 2,777,079
Patented Jan. 8, 1957

2,777,079

OUTDOOR MOTOR

Robert W. Egglestone and Paul E. Graham, Buffalo, N. Y., assignors to Westinghouse Electric Corporation, East Pittsburgh, Pa., a corporation of Pennsylvania Application September 23, 1953, Serial No. 381,848

8 Claims. (Cl. 310—58)

The present invention relates to the construction of dynamoelectric machines, and, more particularly, to an enclosed, ventilated machine intended for outdoor service.

The principal object of the invention is to provide a dynamoelectric machine which is substantially weatherproof, so as to be suitable for outdoor use, but which is adequately ventilated by circulation of air through the machine.

Another object of the invention is to provide a dynamoelectric machine in which ventilating air enters and leaves the machine through an enclosing housing which is arranged to positively exclude foreign matter from the machine, so that the machine is adequately ventilated but can be installed outdoors where it is exposed to adverse weather conditions, such as rain or snow, and to wind-blown foreign materials, such as dirt, leaves, etc.

A further object of the invention is to provide a dynamoelectric machine in which ventilating air enters through an enclosing housing arranged so that the air is caused to change direction a plurality of times before entering the machine itself, so as to remove any foreign matter from the air, and in which the air is discharged from the machine through a discharge duct which is arranged to positively prevent entrance of foreign matter into the machine.

Still another object of the invention is to provide a dynamoelectric machine which is enclosed so as to be suitable for outdoor service, but with adequate circulation of ventilating air, and which can be designed so that its mounting dimensions are the same as those of standard motors, that is, the relative location and spacing of the mounting feet and shaft can be made to conform to the standards which have been established for other types of machines.

More specifically, a dynamoelectric machine is provided which is closed at the bottom or lower part, and which is provided with enclosing housing members which completely enclose the upper part of the machine. The housing members include side housings through which ventilating air enters and which direct the air into end housings from which it flows into the machine itself, the arrangement being such that the air is caused to flow in a predetermined path having a plurality of changes of direction. The top of the machine is enclosed by a top housing member having a longitudinal discharge duct which receives air which has passed through the machine and discharges it to the outside, the duct being arranged so that any foreign matter carrier into it passes straight through from one end to the other and is prevented from entering the machine itself.

The invention will be more fully understood from the following detailed description, taken in connection with the accompanying drawing, in which.

Figure 1:
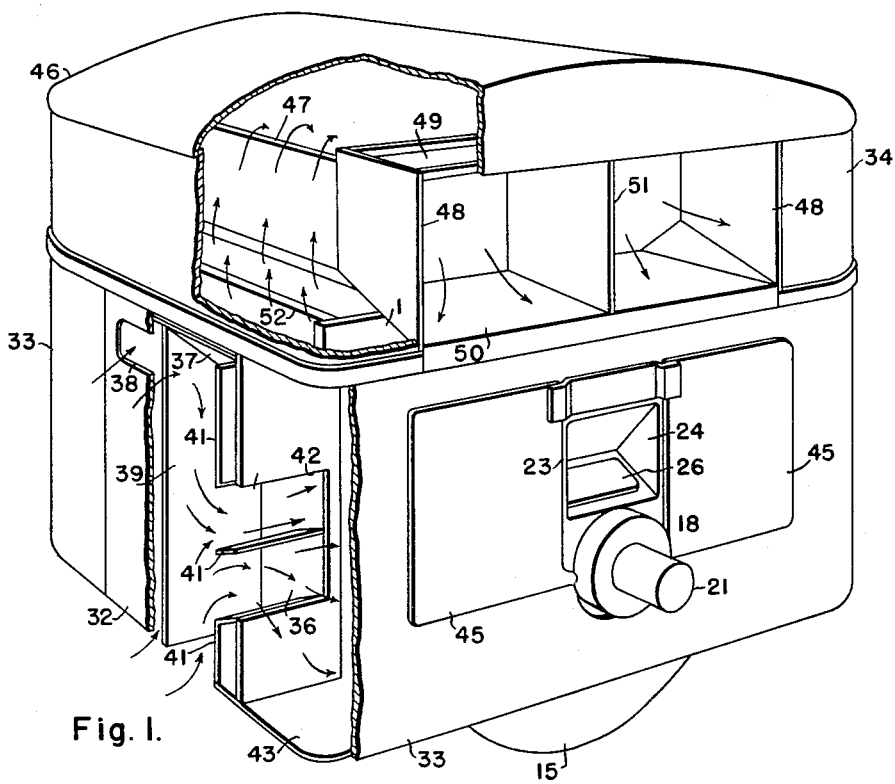
Figure 1 is a perspective view of a motor embodying the invention with parts of the housing broken away.
Figure 2:
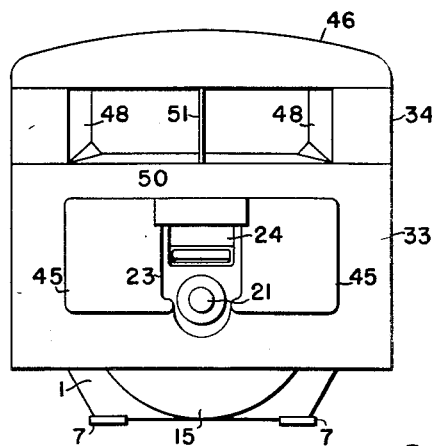
Fig. 2 is an end view of the motor.

The invention is shown in the drawing embodied in an alternating current induction motor, although it will be obvious that the invention is applicable to motors or generators of any desired type. The machine shown in the drawing for the purpose of illustration has a frame structure which includes spaced end plates 1 welded, or otherwise secured, to longitudinal bars 2 and 3 at the top and bottom. Additional longitudinal bars 4 are preferably also provided extending longitudinally between the end plates and welded to the plates, any necessary number of such bars being used. The sides of the frame are closed by side plates 5, which extend to the bottom of the end plates 1 and which terminate somewhat below the top of the end plates, so that the top of the frame structure is open. The bottom of the frame structure is closed by a bottom plate 6 which extends between the end plates and side plates at the bottom of the structure. Mounting feet 7 of any suitable or usual type are welded to the bottom of the frame structure.

A stator core 8 of the usual laminated construction is supported in the frame structure. The core 8 consists of annular laminations having peripheral slots 9, in which a primary winding 10 is placed, and the laminations are stacked with radial air ducts 11 at spaced intervals. The stator core 8 is clamped between end rings 12 which are welded to longitudinal ribs 13, and the core may be supported in the frame structure by welding or otherwise attaching the ribs 13 to the longitudinal bars 2, 3 and 4.

Figure 4:
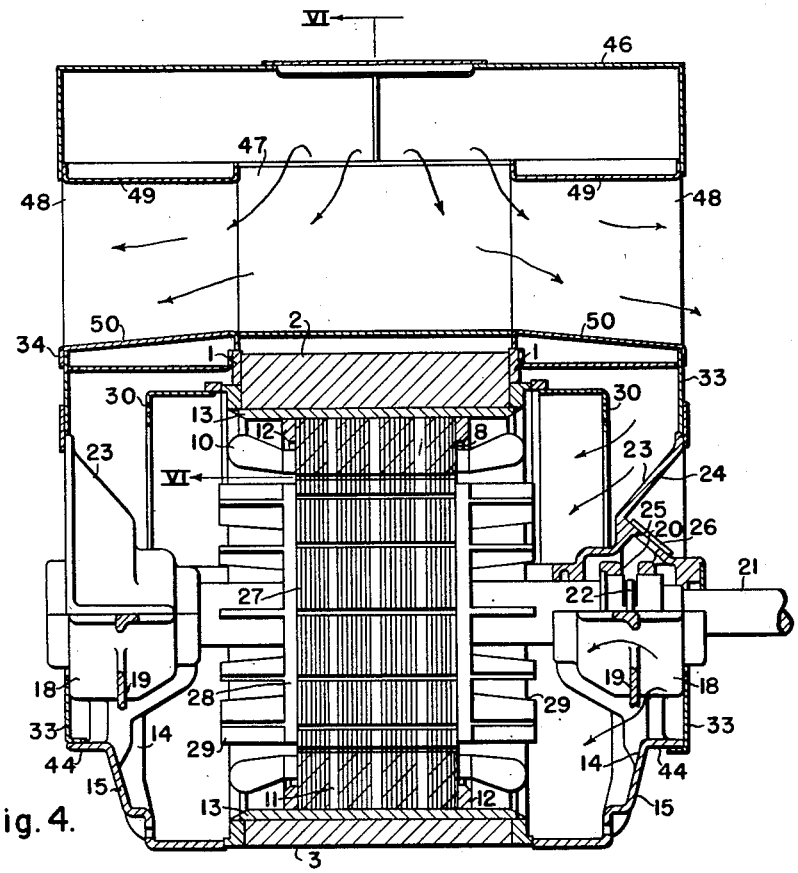
Fig. 4 is a longitudinal sectional view approximately on the line IV—IV of Fig. 5.
Figure 3:
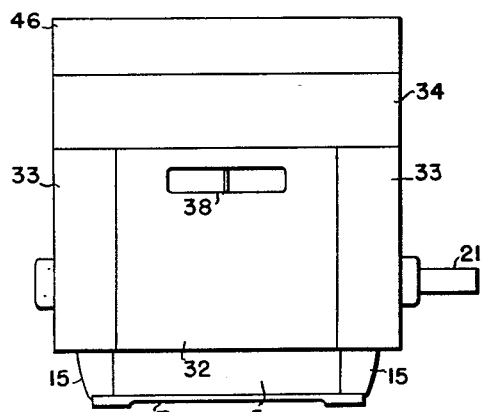
Fig. 3 is a side view of the motor.
Figure 5:
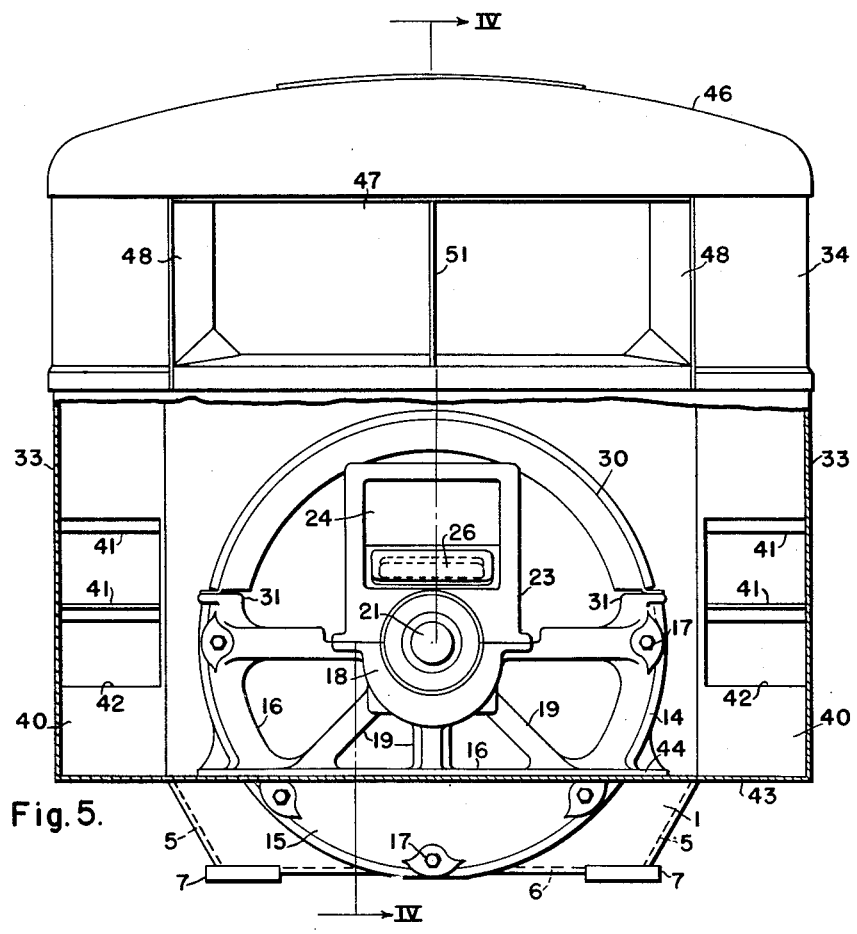
Fig. 5 is an end view of the motor with the end housing broken away.
Figure 6:
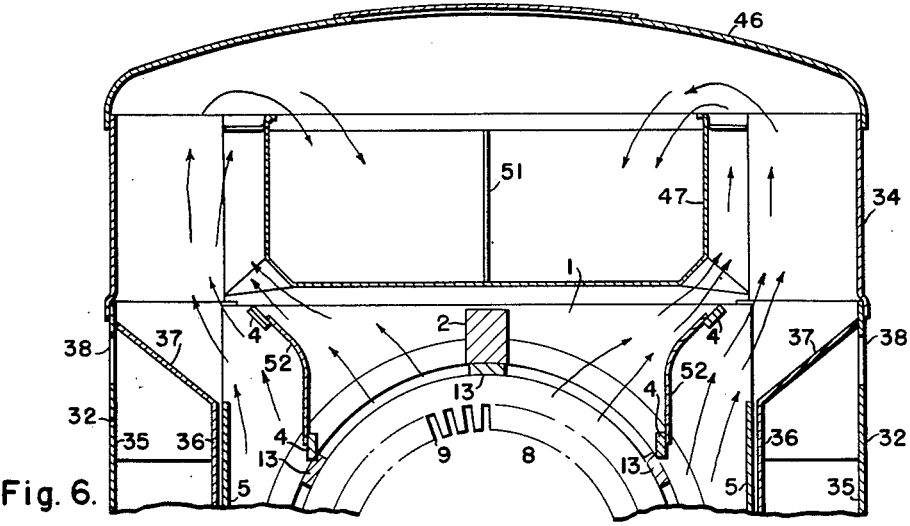
Fig. 6 is a transverse sectional view of the upper part of the machine approximately on the line VI—VI of Fig. 4.

An end bracket 14 is provided at each end of the frame structure. As shown in Figs. 4 and 5, the end brackets 14 are substantially semicircular and have an imperforate lower part 15. Openings 16 are provided in the space between the imperforate lower part and the top of the bracket, which is approximately in the plane of the horizontal diameter of the stator core. The brackets 14 may be secured to the frame structure in any suitable manner, as by bolts 17. Each of the end brackets includes a bearing housing 18, which may be integral with the bracket, and which is supported on the generally radial arms 19 which form the openings 16. The bearing housing 18 is preferably split horizontally, as shown, and supports a bearing 20 for a shaft 21. The bearing 20 may be of any suitable type and is shown as a sleeve bearing lubricated by an oil ring 22. The removable upper part 23 of the bearing housing extends vertically upward above the bracket and has an angular recess 24. The recess 24 has an opening 25 formed in its lower surface which is normally closed by a transparent cover 26 to permit inspection of the bearing and oil ring.

The shaft 21 carries a laminated rotor core 27, of any suitable type, which may have ventilating passages and radial air ducts formed in it, and which is provided with a secondary winding shown as a squirrel-cage winding 28. The rotor carries fan blades 29, which are shown as being formed integrally with the squirrel-cage winding 28, and which serve to effect the desired circulation of air through the machine. It will be understood that, if desired, a separate fan or blower mounted on the shaft might be used instead of the integral blades 29. A substantially semicircular cover member 30 may be secured to the end plate 1 at each end of the machine, extending over the end turns of the winding 10, above the end bracket 14, and the lower ends of the cover 30 may be attached to horizontal pads 31 formed at the top of the end bracket 14. The cover 30 forms an enclosure for directing air around the end turns of the winding, and an air shield of any desired type might be mounted on the cover 30, if desired.

In order to provide for the required circulation of ventilating air through the machine, and to exclude foreign matter, the upper part of the machine is enclosed by a housing which includes side housings 32, end housings 33, and a top housing 34. The side housings 32 are mounted on the side plates 5 at each side of the machine. The side housings 32 may be made of sheet metal and each has an outer wall 35 and an inner wall 36. The side housings are closed at the top by a sloping top member 37 and are open at the bottom to provide an air inlet. Another air inlet opening 38 is provided in the outer wall 35 of the side housing near the top. A central partition or baffle member 39 extends between the inner and outer walls to direct air entering the inlet openings in opposite directions toward the opposite ends of the machine through the air passages formed by the walls 35 and 36. The ends of the side housings are closed by end walls 40 and baffle members 41 are mounted adjacent a central opening 42 of relatively large size in each end wall 40. The baffle member 39 limits the angle at which water or foreign matter may be carried into the housing by the air and prevents foreign matter from entering at an acute angle longitudinally of the machine. The amount of foreign matter reaching the openings 42 is thus materially reduced. The baffles 41 also tend to exclude foreign matter from the openings 42 and slope downward so that water striking them drains back to the bottom inlet opening.

The end housing 33 at each end of the machine may also be made of sheet metal and extends across the end of the machine and curves around at each side to join the side housings 32, as clearly shown in Fig. 1. The bottom of the end housing is closed by bottom plates 43 at each side of the end bracket 14. The end housing 33 has a central opening which fits over the bearing housing 18 of the end bracket, and the lower edge of the central part of the end housing is secured to a horizontal ledge 44 which extends transversely of the bearing bracket. Thus, the end housing 33, plates 43 and the lower imperforate portion 15 of the end bracket completely enclose the end of the machine so as to prevent the entrance of foreign matter. If desired, the end housing may be provided with access openings on each side of the bearing housing which are normally closed by removable covers 45 engaging the upper part 23 of the bearing housing. Thus, by removing the covers 45, the upper part of the bearing housing can be removed and the bearing replaced without disturbing the brackets 14.

Air enters the housing on each side through the air inlets at top and bottom of the side housings 32, and in so doing necessarily changes its direction. In the side housing, the air changes direction again and flows longitudinally toward one end of the machine or the other, the direction of air flow being indicated by arrows on the drawing. Since foreign matter, such as rain or snow, or solid material such as leaves or dirt, which may be carried by the air tends to travel in straight lines, these changes in direction of the air remove most of the foreign matter carried into the side housing, and the foreign matter falls out through the open bottom of the side housing.

Air flowing through the side housings 32 passes through the openings 42 into the end housings 33 and thus makes another ninety degree change of direction. The cross-sectional area of the air path in the end housings is very large and the air therefore has low velocity as it makes this turn so that any foreign matter carried through the openings 42 falls to the bottom of the end housings 33. Means may be provided at the bottom of the end housings for removing such foreign matter. The air flowing through the end housings makes another ninety degree turn, again at low velocity, to flow through the openings 16 and the space between the bracket 14 and the cover 30, so that any traces of foreign matter not already removed falls to the bottom of the end housings. Thus, air entering the housing in either side makes four changes of direction before entering the interior of the machine itself and any foreign matter is effectively removed and prevented from getting into the machine.

The top of the machine is closed by the top housing 34 which extends over the entire top of the machine and is secured to the side housings 32 and end housings 33, the top of the housing 34 being closed by a cover 46. The top housing 34 contains a discharge duct 47 which extends longitudinally from end to end of the machine above the frame structure. The duct 47 is generally trough-shaped, being open at the top but closed at the bottom and sides. The end portions of the duct are closed at the top and the ends are open to the outside. The end portions are preferably somewhat flared, as shown in Fig. 1, and may be formed by sheet metal side members 48, a top member 49 and a bottom member 50. A central partition 51 may also be provided in the end portions of the discharge duct to limit the angle at which rain or other foreign matter may be blown into the duct. The duct 47 extends continuously from end to end of the machine, and since it is open at both ends, any foreign material which may get into the duct is carried through it from one end to the other and blown out. The duct is made deep enough to prevent any possibility of such material being carried into the machine, and the sides of the duct preferably have inwardly extending lips to prevent water from being blown over the sides.

Ventilating air flows into the machine through the side and end housings, as previously explained, and passes through the ventilating passages and over the windings of the rotor and stator to remove the heat generated in the machine. The heated air is discharged radially through the radial ducts 11 of the stator core, and over the end turns of the stator winding. The air thus discharged flows upward, as indicated by arrows on the drawing, and baffle members 52 are preferably provided to direct its flow. The air thus flows into the top housing 34, and spills over into the central portion of the duct 47 through the open top of the duct, and is discharged to the outside through the duct 47. The air discharged into the top housing 34 is prevented by the top members 37 of the side housings from escaping at the sides, and the bottom members 50 of the end portions of the duct 47 prevent the air from getting into the end housings, so that recirculation of heated air is prevented and the air is discharged through the longitudinal discharge duct 47. Since the air inlet openings are at the sides and the discharge openings are at the ends of the machine and at a higher level, there is no danger of the heated air discharged from the machine being recirculated since it will tend to rise away from the machine.

It should now be apparent that a dynamoelectric machine has been provided which is especially suitable for outdoor service, since it is enclosed in such a manner that foreign material cannot enter the machine, but which is adequately ventilated by circulation of air through the machine. The construction is such that the housing members, through which air enters and leaves, enclose the upper part of the machine, while the lower part or bottom of the machine is completely enclosed but is outside the housing. This construction makes it possible to locate the relative positions of the shaft 21 and the mounting holes in the feet 7 so as to conform to the mounting dimensions which are standard for other types of machines. The machine can, therefore, be installed interchangeably with conventional machines, which is an important practical advantage.

Adequate ventilation is provided, since the air flows freely through the machine with relatively little obstruction, yet foreign matter is positively prevented from being carried into the machine by the air because the air enters in a predetermined path which has a plurality of changes of direction, so that any foreign matter is removed from the air. The discharge duct 47 permits free discharge of heated air from the machine, but positively excludes foreign matter since anything that may get into the duct, or be blown into it, will pass straight through and out the other end and cannot get into the machine itself. It is also to be noted that the air inlets in the side housings are spaced a considerable distance above the feet of the machine, so that there is no danger of the air inlets being blocked by snow during the winter, and the machine is thus suitable for outdoor installation, even in severe climates. The bearing are accessible for inspection through the openings 25 in the recesses 24 of the bearing housings and can be replaced if necessary without any dismantling of the machine. If desired, an oiler of any usual type might be provided, extending out from each bearing housing through the end housing, to facilitate lubrication of the bearings when necessary.

A particular embodiment of the invention has been shown and described for the purpose of illustration, but it will be obvious that various modifications and other embodiments are possible within the scope of the invention. It is to be understood therefore, that the invention is not limited to the specific details of construction shown and described for the purpose of illustration, but in its broadest aspects it inclueds all equivalent embodiments and modifications.

We claim as our invention:

1. A dynamoelectric machine having a stator member and a rotor member, housing means enclosing the machine and having inlet openings at the sides of the machine for the entrance of ventilating air, said housing means including means for directing air to the ends of the machine and into the machine in a predetermined path having a plurality of changes of direction, and a discharge duct enclosed in the upper part of the housing means, said discharge duct extending longitudinally from end to end of the machine above the stator member, the top of at least the central portion of the duct being open to receive air discharged from the machine, and the ends of the duct being open to discharge the air to the outside.

2. A dynamoelectric machine having a stator member and a rotor member, housing means enclosing the machine and having inlet openings at the sides of the machine for the entrance of ventilating air, said housing means having air passages extending from the inlet openings towards the ends of the machine to direct the air into the end portions of the housing means, said end portions directing the air into the ends of the machine, whereby the air is caused to flow into the machine in a predetermined path having a plurality of changes of direction, and a discharge duct enclosed in the upper part of the housing means, said discharge duct extending longitudinally from end to end of the machine above the stator member and being adapted to receive air discharged from the machine, the ends of the duct being open to discharge the air to the outside.

3. A dynamoelectric machine having a stator member and a rotor member, housing means enclosing the machine, said housing means including side portions at each side of the machine, said side portions having air inlet openings at the side and bottom thereof for the entrance of ventilating air, means in the side portions for causing the air to change direction and flow towards the ends of the machine, the housing means also including end portions at the ends of the machine for receiving air from the side portions and causing the air to again change direction and flow into the ends of the machine, and a discharge duct enclosed in the upper part of the housing means, said discharge duct extending longitudinally from end to end of the machine above the stator member, the top of at least the central portion of the duct being open to receive air discharged from the machine, and the ends of the duct being open to discharge the air to the outside.

4. A dynamoelectric machine comprising a stator member and a rotor member, enclosing means completely enclosing the machine, said enclosing means including side housing members at each side of the machine, each of the side housing members having inlet openings for entrance of ventilating air into the housing and air passages extending from the inlet openings toward the ends of the machine, end housing members at the ends of the machine, the end housing members receiving air from the side housing members and directing the air into the ends of the machine, and a top housing member enclosing the top of the machine, the top housing member having a discharge duct therein extending longitudinally of the machine above the stator, the discharge duct extending from end to end of the machine and being open to the outside at both ends and being adapted to receive and discharge air which has passed through the machine and to prevent entrance of foreign matter into the machine.

5. A dynamoelectric machine comprising a stator member and a rotor member, enclosing means completely enclosing the machine, said enclosing means including side housing members at each side of the machine, each of the side housing members having inlet openings at the side and bottom thereof for entrance of ventilating air into the housing, the side housing members having air passages extending towards the ends of the machine and means for causing the air to change direction and flow through said passages, end housing members at the ends of the machine, the end housing members being joined to the side housing members to receive air therefrom and being shaped to cause the air to change direction and flow into the ends of the machine, a top housing member enclosing the top of the machine, and a discharge duct enclosed in the top housing member, said discharge duct extending longitudinally from end to end of the machine above the stator member, the upper side of the discharge duct being open to receive air discharged from the machine and the ends of the discharge duct being open to the outside.

6. A dynamoelectric machine having a stator member and a rotor member, the stator member including a frame structure, a stator core supported in the frame structure, the frame structure enclosing the lower part of the machine, end brackets at the ends of the frame structure supporting bearings for the rotor member, the lower part of said end brackets being imperforate to enclose the lower part of the machine, and the end brackets being constructed to permit free entrance to air into the machine above the lower part, housing means enclosing the machine above said lower part, the housing means having inlet openings for ventilating air at both sides and means for directing the air towards the ends of the machine and into the machine in a predetermined path having a plurality of changes of direction, and the housing means including a discharge duct in the upper part thereof, said discharge duct extending longitudinally of the machine above the stator member and being adapted to receive air escaping from the machine and discharge the air to the outside.

7. A dynamoelectric machine having a stator member and a rotor member, the stator member including a frame structure, a stator core supported in the frame structure, the frame structure enclosing the lower part of the machine, end brackets at the ends of the frame structure, said end brackets being substantially semi-circular and having imperforate lower portions to enclose the lower part of the machine, the end brackets having openings for ventilating air between the imperforate lower part and the top of the bracket, each end bracket having a bearing housing at its top, bearings in the bearing housings for the rotor member, side housing members at each side of the machine enclosing the sides of the machine above said lower part, the side housing members having inlet openings for ventilating air and means for directing the air towards the ends of the machine, end housing members at the ends of the machine engaging the side housing members and the end brackets and bearing housings to enclose the ends of the machine, the end housing members directing air from the side housing members into the ends of the machine, and a top housing member engaging the side and end housing members to enclose the top of the machine, the top housing member having a discharge duct therein, said discharge duct extending longitudinally of the machine above the stator member and being adapted to receive air escaping from the machine and discharge the air to the outside.

8. A dynamoelectric machine having a stator member and a rotor member, the stator member including a frame structure, a stator core supported in the frame structure, the frame structure enclosing the lower part of the machine, end brackets at the ends of the frame structure, said end brackets being substantially semi-circular and having imperforate lower portions to enclose the lower part of the machine, the end brackets having openings for ventilating air between the imperforate lower part and the top of the bracket, each end bracket having a bearing housing at its top, bearings in the bearing housings for the rotor member, each bearing housing having an upwardly extending portion with a recess therein, an opening in said recess and a removable cover closing the opening, side housing members at each side of the machine enclosing the sides of the machine above said lower part, the side housing members having inlet openings for ventilating air and means for directing the air towards the ends of the machine, end housing members at the ends of the machine engaging the side housing members and the end brackets and bearing housings to enclose the ends of the machine, the end housing members directing air from the side housing members into the ends of the machine, and a top housing member engaging the side and end housing members to enclose the top of the machine, the top housing member having a discharge duct therein, said discharge duct extending longitudinally of the machine above the stator member and being adapted to receive air escaping from the machine and discharge the air to the outside.

References Cited in the file of this patent
UNITED STATES PATENTS

| 1,360,483 | Wiard | Nov. 30, 1920 |

FOREIGN PATENTS

| 407,193 | Germany | Dec. 17, 1924 |
| 610,951 | Germany | Mar. 20, 1935 |
| 726,639 | France | Mar. 8, 1932 |
| 727,563 | Germany | Nov. 6, 1942 |
| 830,068 | France | May 9, 1938 |